Nov. 29, 1955　　　E. JOHANSON ET AL　　　2,725,150
ARRANGEMENT FOR UNLOADING SHEET-LIKE MATERIALS FROM A DRYER
Filed July 23, 1951　　　2 Sheets-Sheet 2

INVENTORS
ERIK JOHANSON
BERTIL BERGVALL
BY THEIR ATTORNEYS
Howson & Howson

United States Patent Office 2,725,150
Patented Nov. 29, 1955

2,725,150

ARRANGEMENT FOR UNLOADING SHEET-LIKE MATERIALS FROM A DRYER

Erik Johanson and Bertil Bergvall, Jonkoping, Sweden, assignors to AB Svenska Flaktfabriken, Stockholm, Sweden Application July 23, 1951, Serial No. 238,166

Claims priority, application Sweden August 10, 1950

3 Claims. (Cl. 214—16.4)

The present invention relates to novel apparatus for unloading and transporting a plurality of vertically racked sheet-like materials to a single level position.

More particularly the invention relates to apparatus of the character set forth which is especially suited for unloading and transporting individually a plurality of vertically racked sheets of material from a drying oven or humidifying or hardening chamber to a cutting station where the sheets are cut and trimmed to size.

The object of the invention is to provide novel apparatus for unloading and transporting individually a plurality of vertically racked sheets of material as set forth.

Figure 1:
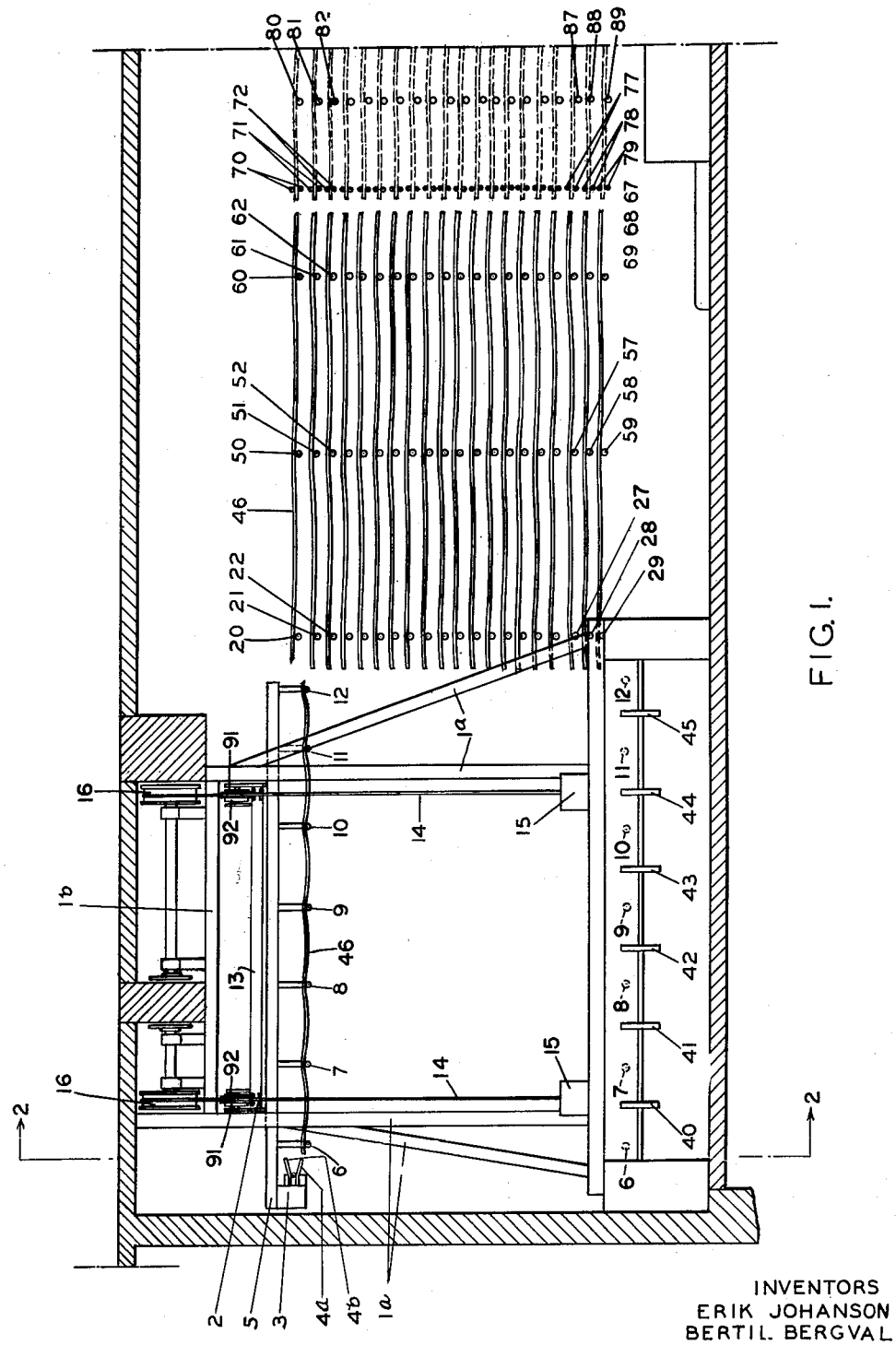
Figure 2:
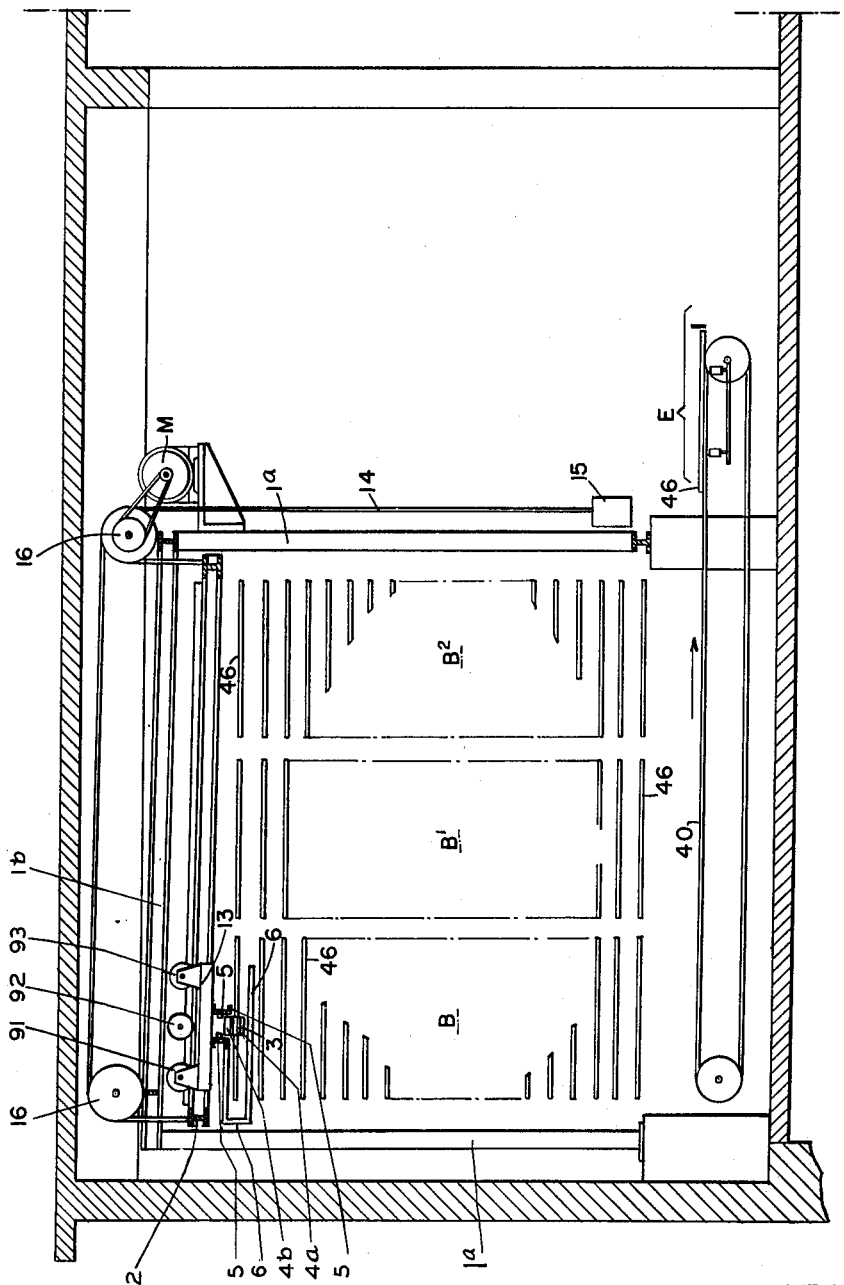

Other objects of the invention and the various features and details of the construction and operation thereof will now be fully set forth and described with reference to the accompanying drawing, in which:

Fig. 1 is a vertical sectional view taken longitudinally through apparatus embodying the present invention; and Fig. 2 is a transverse sectional view thereof taken on the line 2—2, Fig. 1.

Referring now more particularly to the drawing, a plurality of sheets of material 46 are shown supported in vertically spaced relation upon three series of rollers 20, 21, 22—27, 28, 29; 50, 51, 52—57, 58, 59; and 60, 61, 62—67, 68, 69, respectively. A single vertical rack of sheets may be employed, but preferably a plurality thereof arranged in laterally adjacent side-by-side relation as shown at B, B¹ and B² in Fig. 2 of the drawing is employed. The sheets 46 are delivered to the rollers 20—29, 50—59 and 60—69 by means of sets of continuously running nip rollers 70, 71, 72—77, 78, 79 and 80, 81, 82—87, 88, 89.

Disposed in confronting relation to the vertical stacks of sheets 46 endwise thereof is an unloading and transfer mechanism. This mechanism is mounted upon a structural framework comprising vertical and horizontal elements 1a and 1b, respectively. Supported for vertical movement by the structural framework is a table 2 which is raised and lowered by means of wires 14 connected thereto. The wires 14 lead from the table 2 over lift pulleys 16 and thence to counter-weights 15 to which the other ends of the wires 14 are connected. The pulleys 16 may be driven to raise and lower the table 2, for example, by means of a belt and pulley drive from a suitable electric motor M.

Mounted to travel upon the table 2 by means of rollers 91, 92 and 93 is a carriage 13. As best shown in Fig. 2 the carriage 13 is mounted on the table 2 for movement back and forth across the several vertical racks of sheets 46 so that said carriage may be positioned in confronting relation with any one of the racks B, B¹ or B² as desired.

Mounted below the carriage 13 are guide rails 5 which extend perpendicular to the direction of travel of the carriage 13 and longitudinally of the racked sheets 46. Fixedly secured to the lefthand guide rail 5, as viewed in Fig. 2, are a series of supporting arms 6, 7, 9, 10, 11 and 12, respectively. The configuration of these supporting arms 6—12 is best shown in Fig. 2 of the drawing. The supporting arms 6—12 are spaced at about equal intervals longitudinally of the guide rails 5.

Mounted to travel upon the guide rails 5 toward and away from the racks of sheets 46 is a motor driven trolley 3. This trolley carries a pair of gripping jaws 4a and 4b which when the trolley is advanced on the rails 5 all the way to the right in Fig. 1 of the drawing, the gripping jaws 4a and 4b are caused to close upon and engage the leading edge 19 of a selected sheet 46 and the trolley 3 is then returned to its lefthand position drawing with it the gripped sheet 46 which is thereby deposited on the supporting arms 6—12 in the manner and relation shown in Figs. 1 and 2 of the drawing.

After a sheet 46 has been deposited upon the supporting arms 6—12 in the manner described the pulleys 16 are actuated in the proper direction to cause the table 2 to be lowered thereby carrying with it and correspondingly lowering the carriage 13 and guide rails 5 and supporting arms 6—12 with the sheet 46 thereon. The supporting arms 6—12 carried by the guide rails 5 are spaced longitudinally of said rails so that when the table 2 is moved to its lower limit of travel the said supporting arms 6—12 will be disposed intermediate a series of endless belt conveyors 40, 41, 42, 43, 44 and 45, respectively. These belt conveyors 40—45 travel in the direction of the arrow in Fig. 2, that is, in the same direction as the travel of the carriage 13 on the table 2. As shown in Fig. 2 of the drawing the supporting arms 6—12 are open at the end thereof which faces in the direction of travel of the upper course of the belt conveyors 40—45. By this construction, when the table 2 has been moved to its lower position thereby positioning the sheet supporting portions of the arms 6—12 intermediate the several belt conveyors 40—45 and below the level of the upper course thereof, the sheet 46 will be deposited onto the belt conveyors 40—45 which thereupon will operate to transport the sheet 46 to the right, with respect to Fig. 2, to a sawing or trimming station designated E.

Actuation of the motor M and the motor driven trolley 3 as well as opening and closing of the sheet gripping jaws 4a and 4b may be accomplished by conventional and well-known electrical control devices and since such devices are well-known and form no part of the present invention it has not been deemed necessary to burden this description with a detailed disclosure thereof.

In operation of the apparatus the carriage 13 is positioned opposite a selected one of the vertical racks of sheets B, B¹, or B², and the table 2 is raised or lowered to position the sheet delivery means opposite the top or bottom sheet 46 of the selected rack as desired. The trolley 3 is then advanced to engage, say the top sheet 46 of the rack and draw it onto the supporting arms 6—12. The table 2 is then moved to its lower position and the sheet 46 is deposited on the belt conveyors 40—45 which transport it to the cutting or trimming station E. The table 2 is then raised to position the trolley 3 opposite the next lower sheet of the rack and in the same manner this second sheet is drawn onto the supporting arms 6—12 and the table 2 then lowered and the sheet delivered to the belt conveyors 40—45 which in turn transport this second sheet to the cutting or trimming station E. This operation is repeated until all of the sheets in the selected rack B have been delivered individually to the cutting or trimming station E in the manner described and when the rack B has been completed the operation may be continued with respect to the adjacent racks B¹ and B². As the various operations are completed additional racks of sheets 46 may be delivered to the sets of rollers 20—29, 50—59, and 60—69, in the manner previously described. Of course, in lieu of unloading the racks of sheets from the top downwardly, they may be unloaded by starting with the bottom sheet and working upwardly.

Having now described our invention, what we claim as new, and desire to secure by United States Letters Patent is:

1. In apparatus for transporting and delivering sheets of material individually from a rack of the sheets, means to support a plurality of sheets of material in a vertical rack, a table in confronting relation to said rack endwise thereof movable vertically to and from a lower limit position and selected elevated positions corresponding to the different sheets in the rack, mechanism to raise and lower said table and selectively position the same with respect to said sheets, guide rails mounted to move vertically with said table and extending longitudinally of the rack of sheets, support arms on at least one of said rails to receive and support one of said sheets at a time, a trolley movable on said guide rails toward and away from the rack of sheets, sheet gripping means on said trolley to grip a sheet when the trolley is advanced thereto and to draw the sheet onto said support arms when the trolley is retracted, conveyor means positioned to underlie the table in the lower limit position thereof intermediate said support arms and operable to remove a sheet of material from said arms and transport the same to a remote point.

2. In apparatus for transporting and delivering sheets of material individually from a plurality of vertical racks of the sheets, means to support a plurality of sheets of material in a plurality of laterally adjacent vertical racks thereof, a table in confronting relation to said racks endwise thereof movable vertically to and from a lower limit position and selected elevated positions corresponding to the different sheets in the racks, mechanism to raise and lower said table and selectively position the same with respect to said sheets, a carriage movably mounted on said table and selectively positionable in confronting relation to a desired one of said racks of sheets, support arms carried by the table to receive and support a selected one of said sheets at a time, means carried by the table movable toward and away from the racks of sheets, sheet gripping means on said last means to grip a sheet when said last means is advanced thereto and to draw the sheet onto said support arms when said last means is retracted, conveyor means positioned to underlie the table in the lower limit position thereof intermediate said support arms and operable to remove a sheet of material from said arms and transport the same to a remote point.

3. In apparatus for transporting and delivering sheets of material individually from a plurality of vertical racks of the sheets, means to support a plurality of sheets of material in a plurality of laterally adjacent vertical racks thereof, a table in confronting relation to said racks endwise thereof movable vertically to and from a lower limit position and selected elevated positions corresponding to the different sheets in the racks, mechanism to raise and lower said table and selectively position the same with respect to said sheets, a carriage movably mounted on said table and selectively positionable in confronting relation to a desired one of said racks of sheets, guide rails on said carriage extending longitudinally of the racks of sheets, support arms on at least one of said rails to receive and support a selected one of said sheets at a time, a trolley movable on said guide rails toward and away from the racks of sheets, sheet gripping means on said trolley to grip a sheet when the trolley is advanced thereto and to draw the sheet onto said support arms when the trolley is retracted, conveyor means positioned to underlie the table in the lower limit position thereof intermediate said support arms and operable to remove a sheet of material from said arms and transport the same to a remote point.

References Cited in the file of this patent

UNITED STATES PATENTS

| | | |
|---|---|---|
| 1,876,171 | Rosener | Sept. 6, 1932 |
| 2,438,896 | Bowen et al. | Apr. 6, 1948 |